(No Model.)
B. G. LAMME.
METHOD OF AND MEANS FOR STARTING SYNCHRONOUS MOTORS.
No. 519,862. Patented May 15, 1894.
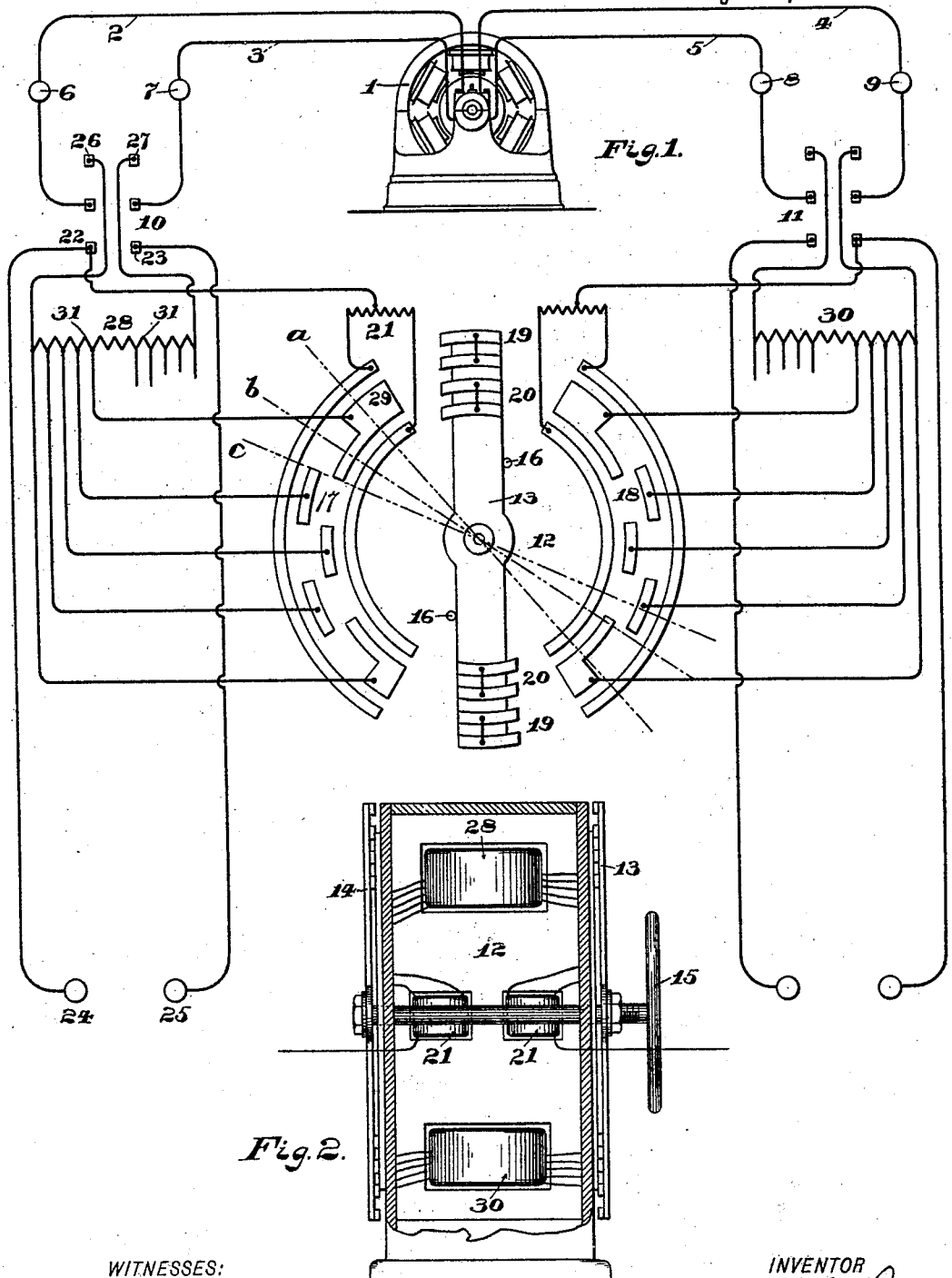
WITNESSES:
George Brown Jr.
H. C. Tener
INVENTOR
Benjamin G. Lamme
BY
Terry and MacKay
ATTORNEYS

United States Patent Office.

BENJAMIN G. LAMME, OF PITTSBURG, PENNSYLVANIA, ASSIGNOR TO THE WESTINGHOUSE ELECTRIC AND MANUFACTURING COMPANY, OF SAME PLACE.

METHOD OF AND MEANS FOR STARTING SYNCHRONOUS MOTORS.

SPECIFICATION forming part of Letters Patent No. 519,862, dated May 15, 1894.

Application filed April 5, 1893. Serial No. 469,171. (No model.)

*To all whom it may concern:*

Be it known that I, BENJAMIN G. LAMME, a citizen of the United States, residing in Pittsburg, in the county of Allegheny and State of Pennsylvania, have invented a new and useful Improvement in Methods of and Means for Starting Synchronous Motors, (Case No. 548,) of which the following is a specification.

My invention relates to the starting and regulation of alternating current translating devices, and more especially to starting synchronous motors under load.

Although by invention is particularly adapted to such motors of the above class as are driven by multiphase currents, it is also applicable to single phase currents, and will be so claimed hereinafter.

My invention is also useful as a device for controlling the alternating parts of machines which are used for changing alternating currents to direct currents.

It is well known that the initial torque of synchronous motors is so small as to prevent their starting under a load, as ordinarily constructed, and it has hitherto been proposed to start such a motor by the use of multiphase currents applied to the armature of the motor, the field magnets being excited by induction on starting, as well as by a commutator, which, when the motor reaches synchronism, acts to carry a practically continuous current to the field magnets, thus converting the machine into a self-exciting synchronous motor. It is for use with machines of this class that my invention is more particularly adapted. In these motors the counter electromotive force is preferably kept as nearly as possible equal to the impressed electromotive force, and, the field magnets being provided with a large number of ampère turns, the armature is overpowered thereby, and has but little effect comparatively, upon the field magnets. In order to get as large a counter electromotive force as possible on starting the motor, it is necessary to send a very large current through the armature, inasmuch as the strength of the field magnets depends during the start upon the direct induction of the armature upon the field magnets. This large current is lagging almost ninety degrees behind the electromotive force wave, and the energy consumed at the motor is extremely small. This current must, however, be supplied by the generator, and, not only does it give rise to a greatly increased loss of energy on the line, but the rush of current through the armature of the generator is so great that the armature magnetism largely counteracts that of the field magnets, weakens the latter, and thus causes a serious drop in potential at the generator, which is felt throughout the line. Moreover, where the motor to be started is about as large as the generator driving it, the drop in potential may become as great as thirty-three or even fifty per cent. of the normal, and the generator be thus stopped. In the last named case, if the impressed electro motive force at the motor were decreased one-third or one-half as the case might be, the induction in the motor armature would be one-third or one-half of its normal value. The ampère turns in the armature would be greatly reduced, but may still be very large, and quite sufficient for good starting. There are three ways in which this reduction in impressed electromotive force available at the armature terminals may be reached. Resistances may be introduced—choking coils may be used—or converters may be employed. In the first two cases named the full current supplied to the motor, while somewhat reduced, must still be supplied by the generator, and must go to increase the ampère turns on the armature of the same. In the third case, only one third or one half of the motor current passes through the generator armature, and the evil effects above noted are avoided.

As stated above, my invention applies particularly to such motors and transformers as are driven by multiphase currents on starting. These currents are most conveniently produced by closed circuit generators, such, for instance, as the Gramme type of dynamo. Where currents of this character are produced, it is important that the circuits carrying the different phases of current should be treated symmetrically, in order not to throw the generator out of balance. In illustration of this point, let a two-phase system be considered wherein the two currents are carried off from the extremities of two diameters of the armature, at right angles to each other.

In such an armature there are really six circuits, the currents being properly considered not only as flowing between oppositely placed connections, but between adjacent connections as well. The motor is built on the same plan as the generator, in these cases, and the same six circuits exist therein. The six circuits in the motor must therefore be varied simultaneously and symmetrically, otherwise there will be local currents in the motor armature, and corresponding local currents in the generator. In raising the electromotive force at the motor terminals as the counter electromotive force rises in starting, the circuits, must, therefore, retain their symmetrical relation for the best results. This means that the four leads must vary their connections at the same time and in the same way. My invention therefore further contemplates the use of such means as will permit of a symmetrical treatment of circuits in machines of the character above set forth.

My invention is further designed to provide certain details of structure calculated to produce safety and convenience in use of the above named means, and these will appear more fully in the following description:

In the accompanying drawings, whereby my invention is illustrated in one of its forms, Figure 1 shows in diagram as much of the arrangement of circuits and machinery as is essential to a full understanding of the principle and mode of operation of my invention, and Fig. 2 is a sectional view of one form of controlling stand adapted to carry out my method of action.

At 1 is shown a generator from which multiphase currents are being delivered to the mains 2, 3, 4 and 5.

I show herein my invention as applied to two phase systems, but it is evident that any other number of phases may be employed in this connection.

The four leads are brought to the terminals, 6, 7, 8 and 9, as shown, whence the current is carried to the two switches 10 and 11. These may be any well known form of switch whereby current may be carried to either of two pairs of terminals, as indicated.

The controller 12, as shown in Fig. 2 has two faces, and two swinging bars moving over contacts on said faces. These bars are shown at 13 and 14, and are moved together by means of any suitable handle, as the wheel 15. The contacts on each face of the controller are arranged in two symmetrical and oppositely placed annular sectors, one on each side of the swinging bar, 13. As the swinging bar on each side always moves in the same direction, and is prevented from opposite movement by stops 16, one end of the bar always makes contact with one series of plates, 17 and the other end with the other series 18; and as these plates are similarly arranged with respect to said bar, it will only be necessary to describe the construction and operation of one of these series with relation to the swinging bar. Simultaneous movement of the opposite bars 13 and 14 is obtained as shown by mounting them on a common axis, but other means might evidently be used for securing this simultaneous movement.

At each end of the swinging bar 13 there are two spanning connections, whereby current may be carried from one contact to another. These connections consist as preferred by me, each of a pair of electrically connected plates, 19 and 20. The series 17 is so disposed as to co-operate with these spanning plates on the swinging arm, as will be described below. The outer and inner plates of the series 17 are continuous and lie in the arc of a circle, they are connected preferably through the preventive coil 21 to the terminal 22 of the switch 10. This terminal 22, and the terminal 23 are connected directly to the terminals 24 and 25 of the motor, for supplying one of the two phase currents; while the other phase is supplied to the motor in a precisely similar manner through the series of contacts 18.

The terminals 26 and 27 of the switch 10 are connected directly to the two extremes of the auto-converter coil, 28. Proceeding from each end of this coil inward, connections are taken off from the coil at proper intervals, and are carried to the divided contacts of the two series 17 on the two opposite faces of the controller. I have shown connections with only one of these series from the converter, in order to avoid confusion of circuits. It will be understood that the series on the other, non-visible, face of the controller are arranged in every respect like those on the visible face, and that a second preventive coil 21 is connected therewith just as shown in the figure for the visible side of the controller. This is clearly indicated in Fig. 2, where two coils 21 are shown, one on each side of the controller.

It is, of course, obvious that it is not necessary to my invention that the two pairs of contact series should be in different planes.

To start the motor, suppose the switch 10 to be thrown so as to bring the terminals 6 and 7 respectively into connection with 26 and 27, and let us suppose the arm to be in the position indicated by the dotted line a. The current entering at 26 will pass through the auto-converter from left to right until it reaches the connection passing to the plate 29. Thence it will cross to the two terminals of the preventive coil 21. This coil is connected to the terminal 22 from its middle point. It will therefore be seen that it will have no inductive effect upon the current thus passing in at both ends at once. From the preventive coil, the current passes to terminal 22, thence to 24, through the armature, and out through 25 and 23. The point being connected with the invisible contacts of the controller in the same relation as 22 is connected with the visible contacts it is clear that the current will return from 23 to 27 and back to the generator through the invisible preventive coil contacts 17, and the right hand coils of the auto-converter. The same course will be taken by the other phase current through the auto-converter 30 and visible and invisible series of contacts, 18. In this position of the switch and controller the motor will be getting the minimum electromotive force, and the maximum of current. As shown in Fig. 1, about one-third of the line potential will be thus placed across the armature terminals. As the armature begins to gain speed, and the counter electromotive force rises, the arm may be carried through the position marked $b$ in Fig. 1, where coils 31 are cut out, into that marked $c$. Here it will be seen that the last coil section 31 is on the point of being cut out by the arm, and is temporarily short-circuited. It is here that the preventive coil 21 is useful. The short-circuit must be completed through this coil 21, which then acts as a choking coil, and prevents a rush of current through the coils 31 in each end of each auto-converter, and consequent disturbance of the motor and auxiliary circuits. If desired the preventive device 21 may be a simple ohmic resistance in coil or other form, and I have claimed the "preventive" device broadly in this combination intending to cover either form. Further movement of the arm will thus successively short circuit and cut out one by one the coil sections of the auto-converter; and this process will go on in both ends of both auto-converters at one time, thus affecting the four terminals of the armature in the same way at the same time, and preserving the symmetry of circuits, as above pointed out. Thus the electromotive force on the machine is increased until finally the switches 10 and 11 can be thrown in the opposite direction, and the terminals 22 and 23 brought into connection with 6 and 7, and the whole line potential applied to the motor.

I have found in practice, that in most properly constructed machines, synchronism will occur before the full potential is applied, and thus the remaining variations in potential may be utilized for regulating the motor, or for varying the potential of the direct current given off, if a current changer is used. I have shown in my drawings an auto-converter as used in this connection, but it is evident that if thought desirable, it is within my invention to use a two circuit converter. In this case the symmetry of circuits is more simply attained, but the converter must be larger for a given ratio of conversion.

It is clear that other means may be devised for symmetrically changing the potential on the motor armature circuits, without departing from the spirit of my invention.

What I claim is—

1. The method of starting a self-exciting synchronous motor from a given supply circuit, which consists in applying to the armature thereof a starting current of low potential and large volume, causing said armature to excite the field magnets by induction, and then gradually increasing the potential of the starting current to that of said supply circuit, substantially as described.

2. The method of starting a multi-phase synchronous self-exciting motor from a given supply circuit, which consists in supplying to the armature thereof starting currents of different phases, but of the same low mean potential and large mean volume, causing the armature to excite the field magnets by induction, and then gradually and symmetrically increasing the potential on all the armature circuits until the starting currents are brought to the full potential of the line, substantially as described.

3. The combination of a constant potential alternating current system, and a multi-phase self-exciting synchronous motor; with a converter for each phase of said current having its primary in circuit with the main leads and its secondary in circuit with the motor armature, and means whereby the potential of the secondary circuits may all be symmetrically varied, substantially as described.

4. The combination of a constant potential alternating current system, and a multi-phase self-exciting synchronous motor with an auto-converter for each phase of said current, spanning the main leads, and means whereby successive coil sections at the two ends of each converter may be brought symmetrically into the electrical connection with the terminals of the motor armature, substantially as described.

5. As a means for symmetrically varying the potential and current supplied to a closed coil two phase synchronous motor; two converters for converting the two supplied currents of different phases, a controller having two pairs of similarly arranged stationary plates connected with different points on the secondaries of said converters, and with the terminals of the motor, movable contacts adapted to co-operate with said plates to throw more or less of said secondary coils in circuit with said armature, and means for moving said contacts over said plates, and for preserving at all times the same contact relation in all four series of plates, substantially as described.

6. As a means for symmetrically varying the potential and current supplied to a closed coil two phase synchronous motor; two auto-converters spanning the leads of the two supplied currents, a controller having two pairs of similarly arranged stationary plates connected with different points on the coils of said auto-converters, and with the terminals of the motor, movable contacts adapted to co-operate with said plates to throw more or less of said secondary coils in circuit with said armature, and means for moving said contacts over said plates, and for preserving at all times the same contact relation in all four series of plates, substantially as described.

7. In a device for controlling current delivered from a converter to a translating device, means for preventing the short-circuiting of converter coils, which consist of outer plates connected each through a choking coil with the translating device, and isolated inner plates between said outer plates, each connected to different points of the converter coils; in combination with means for establishing successive electrical connection between each of said inner plates, and said outer plates, substantially as described.

8. In a device for controlling current delivered from a converter to a translating device, means for preventing the short-circuiting of converter coils, which consist of outer plates connected to each other through preventive means for cutting down the current through the translating device, and isolated inner plates between said outer plates, each connected to different points of the converter coils; in combination with means for establishing successive electrical connection between each of said inner plates and said outer plates, substantially as described.

9. As a means for controlling the currents for two phase closed coil motors; two auto-converters spanning the pairs of leads for supplying the two phases of current, a pair of similar and oppositely placed series of contact plates, successively electrically connected to successive points on one side of each auto-converter, and movable contacts adapted to make simultaneous and symmetrical connection between said plates and one pair of motor terminals; in combination with a second pair of series of plates similar to the first pair and electrically connected to successive points on the other side of each auto-converter, such points on the two sides of each converter being symmetrically located, movable contacts adapted to make simultaneous and symmetrical connection between said second pair of series of plates and the second pair of motor terminals; and means whereby simultaneous and symmetrical movement of all of said movable contacts may be secured, substantially as described.

In testimony whereof I have hereunto subscribed my name this 3d day of April, A. D. 1893.

BENJ. G. LAMME.

Witnesses:
JAMES W. SMITH,
HAROLD S. MACKAYE.